US 12,305,348 B2

(12) United States Patent
Bartminn et al.

(10) Patent No.: US 12,305,348 B2
(45) Date of Patent: May 20, 2025

(54) FOUNDATION FOR AN OFFSHORE STRUCTURE

(71) Applicant: Daniel Bartminn, Elmshorn (DE)

(72) Inventors: Daniel Bartminn, Elmshorn (DE); Artur Czarnecki, Hamburg (DE)

(*) Notice: Subject to any disclaimer, the term of this patent is extended or adjusted under 35 U.S.C. 154(b) by 177 days.

(21) Appl. No.: 18/030,023

(22) PCT Filed: Sep. 7, 2021

(86) PCT No.: PCT/EP2021/074593
§ 371 (c)(1),
(2) Date: Apr. 3, 2023

(87) PCT Pub. No.: WO2022/069167
PCT Pub. Date: Apr. 7, 2022

(65) Prior Publication Data
US 2023/0366167 A1 Nov. 16, 2023

(30) Foreign Application Priority Data
Oct. 2, 2020 (DE) .................. 10 2020 125 842.9

(51) Int. Cl.
*E02D 27/52* (2006.01)
*E02D 27/42* (2006.01)
(Continued)

(52) U.S. Cl.
CPC ......... *E02D 27/525* (2013.01); *E02D 27/425* (2013.01); *E02B 2017/0091* (2013.01);
(Continued)

(58) Field of Classification Search
CPC ..... E02D 27/525; E02D 27/425; F03D 13/25; E02B 2017/0091
(Continued)

(56) References Cited

U.S. PATENT DOCUMENTS

| 4,797,031 A * | 1/1989 | Hagimoto | ............... E02D 23/08 |
| | | | 405/133 |
| 8,500,368 B1 * | 8/2013 | Deshazer | ................. E02D 5/22 |
| | | | 405/230 |

(Continued)

FOREIGN PATENT DOCUMENTS

| CN | 111636467 | 9/2020 |
| JP | 06287944 | * 10/1994 |

(Continued)

OTHER PUBLICATIONS

International Preliminary Report on Patentability from corresponding PCT Appln. No. PCT/EP2021/074593, dated Jul. 28, 2022.

(Continued)

*Primary Examiner* — Sean D Andrish
(74) *Attorney, Agent, or Firm* — Grossman, Tucker, Perreault & Pfleger, PLLC

(57) ABSTRACT

A foundation for an offshore structure, more particularly an offshore wind turbine structure, comprising: at least one tower-like foundation structure with a circumferential foundation wall extending in the longitudinal direction, the foundation wall being delimited at the lower end by a lower-end end face, the foundation wall being formed from a mineral construction material; and at least one binding element, which is formed from a metal material and is arranged on the lower-end end face, the length of the binding element from the lower-end face to a lower end of the binding element being at least 0.5 m.

18 Claims, 4 Drawing Sheets

(51) Int. Cl.
  *E02B 17/00* (2006.01)
  *F03D 13/25* (2016.01)
(52) U.S. Cl.
  CPC ............ *E02D 2200/1685* (2013.01); *E02D 2250/0007* (2013.01); *E02D 2250/0023* (2013.01); *E02D 2300/0018* (2013.01); *E02D 2300/0026* (2013.01); *F03D 13/25* (2016.05); *F05B 2240/95* (2013.01)
(58) Field of Classification Search
  USPC ...................................................... 405/231
  See application file for complete search history.

(56) References Cited

U.S. PATENT DOCUMENTS

| | | | | |
|---|---|---|---|---|
| 2008/0236075 | A1* | 10/2008 | Andersen | E02D 27/42 52/297 |
| 2012/0240481 | A1* | 9/2012 | Ingalls | E04B 1/3404 52/73 |
| 2014/0086693 | A1* | 3/2014 | Reinhall | E02D 13/005 405/249 |
| 2017/0275845 | A1* | 9/2017 | Belder | E02D 7/06 |
| 2020/0157759 | A1* | 5/2020 | Savii Costa | E02D 27/425 |

FOREIGN PATENT DOCUMENTS

| | | |
|---|---|---|
| KR | 101281601 | 7/2013 |
| KR | 101403455 | 6/2014 |

OTHER PUBLICATIONS

International Search Report from corresponding PCT Appln. No. PCT/EP2021/074593, dated Dec. 14, 2021. English translation attached.

\* cited by examiner

FOUNDATION FOR AN OFFSHORE STRUCTURE

FIELD

The application relates to a foundation for an offshore structure, in particular for an offshore wind power structure, comprising at least one tower-shaped foundation structure with a circumferential foundation wall extending in the longitudinal direction (or axial direction), the foundation wall being bounded on the underside by an underside end face, the foundation wall being formed from a mineral building material. Furthermore, the application relates to an offshore structure, a method for producing a foundation and a use.

BACKGROUND

Offshore structures are increasingly being erected, in particular at sea. For example, offshore wind farms with a large number of offshore wind energy structures are installed for the generation of electrical energy or the provision of electrical energy from so-called renewable energy sources. Offshore locations are usually characterised by relatively continuous wind conditions and high average wind speeds, so that so-called offshore wind farms are increasingly being built.

As a rule, an offshore wind farm has a large number of offshore wind energy structures, such as a large number of offshore wind turbines, possibly a measuring mast and/or an offshore transformer station. Via the offshore substation, the offshore wind farm can be electrically connected, for example, to an onshore substation or another offshore substation or offshore converter station. An onshore substation may in turn be connected to a public electricity grid.

An offshore wind turbine is set up to convert the kinetic wind energy into electrical energy. Power cables in the form of submarine cables are laid to transmit the generated electrical energy between two offshore wind energy structures or an offshore wind energy structure and an onshore structure.

In the case of offshore wind energy structures, but also in the case of other offshore structures (e.g. platforms for the exploration of gas and/or oil), it is common practice to directly anchor or found an offshore structure by means of a foundation (e.g. monopile, tripod, tripile or jacket foundations) on or in the subsea construction ground or subsea floor, in particular a seabed.

A foundation usually has a tower-shaped, in particular cylindrical, foundation structure, preferably in the form of a hollow structural element. A tower-shaped foundation structure usually has a circumferential foundation wall extending in the longitudinal or axial direction, the foundation wall being bounded on the underside by an end face on the underside.

In practice, tower-shaped foundation structures are usually made of the metallic material steel. Steel is particularly suitable for such a foundation structure due to its strength and stiffness properties.

It has been found that manufacturing a foundation wall of a tower-shaped foundation structure from a mineral building material (e.g. concrete) has a great cost-saving potential compared to a (pure) steel structure. However, in order to provide sufficient strength, it is necessary to significantly increase the wall thickness of the foundation wall made of a mineral building material compared to a hollow steel structure.

However, an increased wall thickness leads to problems during installation (e.g. by flushing or ramming) of such a foundation structure into the underwater construction ground. In particular, the greater wall thickness increases the resistance during insertion into the underwater ground. This increases the installation effort and, correspondingly, the installation costs, in particular as a result of the inevitable need for substantially larger installation equipment.

SUMMARY

Therefore, the application is based on the task of providing a foundation for an offshore structure in which the above-mentioned disadvantages are at least reduced and, in particular, the installation process of a tower-shaped foundation structure formed from a mineral building material is simplified.

The task is solved according to a first aspect of the application by a foundation for an offshore structure. The foundation comprises at least one tower-shaped foundation structure with a circumferential foundation wall extending in the longitudinal direction. The foundation wall is bounded on the underside by an underside end face. The foundation wall is made of a mineral building material. The foundation comprises at least one binding element formed of a metallic material and arranged on the underside end face, the length of the binding element from the underside end face to a lower end of the binding element being at least 0.5 m.

By providing, in contrast to the prior art, according to the application, a foundation with a tower-shaped foundation structure formed by a circumferential foundation wall, in which a binding element formed of a metallic material with a length of at least 0.5 m is arranged, in particular fastened, on the underside end face, the disadvantages of the prior art are at least reduced and, in particular, the installation process of a tower-shaped foundation structure formed of a mineral building material is simplified. In particular, the resistance of the tower-shaped foundation structure can be reduced by the metallic binding element during the installation process. The displacement of soil material during the installation process is supported, in particular favoured, by the metallic binding element, so that in particular the installation effort and in a corresponding manner the installation costs can be reduced.

The foundation according to the application is in particular part of an offshore structure and preferably serves to support an offshore facility of the offshore structure. An offshore structure is preferably an offshore wind power structure, such as an offshore wind turbine, an offshore met mast or an offshore substation. Further, an offshore structure may be a drilling or production platform or other offshore platform, preferably set up to produce, convert and/or store energy, such as an offshore hydrogen production facility.

As has been described, an offshore structure may comprise an offshore facility which may be fixed by being founded in an underwater bottom or subsoil, in particular a seabed. In particular, an offshore structure may be formed by the offshore device (e.g. a platform, a nacelle, tower, generator, rotor, transformer and/or the like) and the at least one foundation.

The foundation according to the application comprises a tower-shaped foundation structure, preferably in the form of a cylindrical hollow structural element. The cylindrical hollow structural element can in particular be a hollow pile. The tower-shaped foundation structure has a circumferential foundation wall extending in the longitudinal direction or axial direction of the tower-shaped foundation structure. In particular, the tower-shaped foundation structure may have a circular cross-sectional area. In other variants of the application, another cross-sectional surface may also be provided, such as an oval-shaped cross-sectional surface. Further, the application includes disintegrated structures comprising multiple elements engaging the ground, such as jackets, tripods and tri-piles.

The foundation wall may have two distal ends, each bounded by end faces. A first end face may be a top end face and a second end face may be a bottom end face. The top and bottom faces may be defined by the position of the hollow structural element in the final installation state. Thereby, in the installation state, the lower end face is arranged in the underwater bottom, in particular founded, the upper end face may in particular at least protrude from the underwater bottom, preferably from the waterline.

A foundation wall is in particular delimited by an inner wall and an outer wall or by an inner diameter and an outer diameter. The foundation wall is the outer boundary of the tower-shaped foundation structure. The foundation wall is in particular tubular. As has already been described, the foundation wall may be in particular round, elliptical or oval in a cross-section.

According to one embodiment, it is proposed that the tower-shaped foundation structure is hollow cylindrical. The cylindrical shape can increase the structural integrity so that the hollow structural element can absorb higher bending moments.

The foundation wall according to the application is made of a mineral building material. According to one embodiment of the foundation according to the application, the mineral building material may contain cement, at least in parts. The mineral building material is preferably concrete, which is mixed from cement, gravel, sand and water and is hardened, in particular after casting.

According to the application, it has been recognised that a metallic binding element arranged on the underside end face, in particular in the form of a metal shoe, reduces the resistance when inserting the foundation structure. The metallic binding element facilitates in particular the displacement of the soil material during the installation process.

A metallic embedment element has the advantage of a higher strength (compared to an element made of a mineral building material), so that the metallic embedment element (which in an installation state is preferably fully embedded in the underwater soil) can have a lower embedment wall thickness than a wall thickness of the foundation wall.

In particular, a metallic bonding element means that the bonding element does not contain any mineral building material. In particular, the binding element can be formed exclusively from a metallic material. Particularly preferably, the metallic material can be (exclusively) steel.

It is understood that in variants of the application, a mineral building material (e.g. as transport protection) can also be attached to the metallic binding element (in particular at the lower end), whereby in particular at least partial damage to the mineral building material is permitted before or during the insertion process.

The metallic binding element can be located with respect to the underside end face of the metallic element at least in a section which is not further than 3 m from the underside end face of the foundation.

For good load-bearing capacity, it has been found that the water-cement ratio (w/c) of the mineral building material can be less than 0.45, in particular less than 0.35 and especially preferably less than 0.3.

The moments and shear forces occurring in particular in wind turbines can be sufficiently absorbed by the tower-shaped foundation structure in particular if the mineral building material has a strength class of at least C40/50, preferably C70/85, more preferably C100/115 according to EN 206 and EN1992.

Sufficient long-term stability of the tower-shaped foundation structure over the service life of an offshore structure, in particular an offshore wind turbine, especially in the case of permanent penetration by water, can be achieved in particular by the mineral building material having a pore content (air pores) of less than 5%, preferably less than 3%, in particular less than 2%. The total porosity measured with mercury pressure porosity should be <12 vol-% after 28 days P28d and <10 vol-% after 90 days P90d.

Particularly in the case of permanent penetration of water in a foundation structure installation, sufficient durability can be achieved by the mineral building material having a porosity of P28d<12 vol-% when measured by mercury pressure porosimetry, as described earlier. P28d is a measurement over 28 days. Preferably, the porosity is also less than 10 vol-%. For P90d, that is a measurement over 90 days, the porosity is preferably <10 vol-%, in particular <8 vol-%.

Sufficient load-bearing capacity of the foundation structure can be achieved in particular by the mineral building material having a cement content of at least 350 kg/m$^3$, preferably at least 450 kg/m$^3$, in particular preferably at least 650 kg/m$^3$.

Furthermore, the foundation wall can be mechanically prestressed. The prestressing allows cracks to be pressed over and thus the surfaces to be kept largely free of tensile stress, which is particularly advantageous in the case of fluctuating torque loads. The prestressing force is preferably 5%, in particular more than 15% greater than the compressive strength of the foundation wall. The pretensioning force is preferably applied in the longitudinal direction.

According to a further embodiment, the mineral building material can be (metallically) reinforced for even greater stability, in particular under dynamic ambient conditions. The metallic reinforcement is in particular a steel reinforcement. The reinforcement can be provided by fibres or reinforcing bars. Fibre reinforcement can also be provided by carbon fibre, glass fibre or metal fibre.

The reinforcement can be formed in such a way that it has a concrete cover of at least 26 mm, preferably at least 40 mm, at 90% of the measuring points, preferably at 98% of the measuring points.

The mineral building material may be reinforced with ferritic stainless reinforcing steel. The reinforcement may not exceed a chromium content of 18 M %. The reinforcement may contain molybdenum.

The mineral building material may be reinforced with austenitic stainless reinforcing steel. The reinforcement may comprise at least 5 M %, in particular between 5 M % to 14 M % nickel and/or between 12 M % to 22 M %, in particular 15 M % to 20 M % chromium.

The mineral building material may be reinforced with ferritic-austenitic stainless reinforcing steel. The reinforcement may comprise at least 18 M %, in particular between 15 M %-20 M % chromium and 2 M %-8 M % nickel and optionally molybdenum.

For increased stability, it is proposed according to a further embodiment that the mineral building material can be sealed, in particular with a sealing foil. Such a sealing foil can be, for example, an aluminium-butyl sealing foil.

The tower-shaped foundation structure preferably has an embedment length of at least 7 m. This may be sufficient to provide a sufficient foundation for the tower-shaped foundation structure in the ground. Tie-in lengths between 7 m and 20 m are preferred.

According to a preferred embodiment of the foundation according to the application, the length of the tie-in element from the bottom end face to a bottom end of the tie-in element may be between 1 m and 9 m. It has been found that a binding element with such a length significantly facilitates and, in particular, optimally supports the displacement of the underwater soil material. The chosen length may depend in particular on the diameter of the tower-shaped foundation structure and/or the soil properties at the installation site. In particular, the more difficult (especially firmer) the ground conditions are, the more the length can be increased.

As has already been described, the foundation wall may be bounded at the top by a top end face. According to a further embodiment, a wall thickness of the foundation wall may be substantially constant or constant from the top end face to the bottom end face. In other words, the wall thickness preferably remains the same over the entire length of the foundation wall, i.e. it does not change in the course.

In other variants of the application, the wall thickness of the foundation wall can also change, for example taper from the upper-side end face to the lower-side end face (continuously or in steps), wherein in particular the inner diameter of the tower-shaped foundation structure, in particular a hollow structural element, increases as a result of the taper and/or the outer diameter of the tower-shaped foundation structure, in particular a hollow structural element, decreases as a result of the taper.

In principle, the at least one binding element can have any shape. For example, it is conceivable to arrange a plurality of pin-shaped metallic elements on the underside end face, which can be arranged next to each other.

According to a preferred embodiment of the foundation according to the application, the binding element may comprise a circumferential binding wall extending in the longitudinal (or axial) direction. Preferably, the binding wall may be formed entirely of steel. The cross-sectional shape may correspond to the cross-sectional shape of the foundation wall (it is understood that the area sizes may differ). A tie-in element in the form of a circumferential tie-in wall has proven to be particularly advantageous for the displacement of soil material.

According to a further embodiment of the foundation according to the application, a wall thickness of the foundation wall may be at least greater than a wall thickness of the embedment wall. As already described, due to the use of metal, in particular steel, the wall thickness may be reduced at least at a wall section of the embedment wall (compared to the wall thickness of the foundation wall, in particular in the area of the underside end face). This further improves displacement of the soil material.

According to a further embodiment of the foundation according to the application, the wall thickness of the foundation wall can be between 100 mm and 900 mm, preferably between 125 mm and 450 mm. The wall thickness of the tie-in wall (in particular of the connecting section described in more detail below) can be between 10 mm and 100 mm, preferably between 30 mm and 80 mm.

Preferably, the wall thickness of the foundation wall can be 1.5 times to 40 times greater than the wall thickness of the binding wall (in particular of the connecting section described in more detail below).

According to one embodiment of the foundation according to the application the embedment element or a part of the embedment element may be formed in composite construction, preferably of metal, particularly preferably of steel, and a mineral building material (e.g. the building material described above), wherein at least in one section the cross-sectional area of the steel may amount to at least 12% of the gross cross-sectional area.

According to a particularly preferred embodiment of the foundation according to the application, the binding wall, seen in the longitudinal direction, may comprise a free end portion (comprising the lower end of the binding element), a (single) bound end portion and a connecting portion connecting the free end portion to the bound end portion. The bound end portion may be bound in the foundation wall. In particular, this means that the bound end portion extends into the foundation wall and is in particular surrounded by the mineral building material.

Preferably, an end face hole and a dowel anchorage may be used to anchor the bonded end section in the foundation wall.

The portion of the tie-in wall immediately projecting from the underside face is referred to as the tie-in portion, which merges into the free end portion at the lower end. Preferably, the tie-in wall and thus the said sections can be formed in one piece.

According to a preferred embodiment of the foundation according to the application, a wall thickness of the connecting section from the bound end section to the free end section (i.e. in particular over the entire length of the connecting section) can be constant, i.e. essentially not change. The connecting section may have a length between 0.2 m and 6.5 m.

Preferably, the wall thickness of the binding wall may change in the longitudinal direction. In particular, the lower end may be tapered at the free end portion to further facilitate displacement of the soil material.

According to a further embodiment of the foundation according to the application, a wall thickness of the free end portion may differ from a wall thickness of the binding portion (which may in particular be constant). In particular, the wall thickness of the free end portion may taper (steadily or in steps) from the connecting portion to the lower end of the free end portion (i.e. in particular over the entire length of the free end portion). Preferably, the free end portion may have a wedge shape. The wedge shape particularly includes rounded versions of the wedge tip.

Alternatively, a wall thickness of the free end portion may be greater than the wall thickness of the connecting portion. In other words, the wall thickness may be widened or increased compared to the connecting portion. The advantage of such a tie-in element is in particular that the skin friction on the outer wall of the foundation wall can be reduced during installation. This further facilitates the installation process.

In one embodiment, the free end portion may be divided into two sub-portions. In a first sub-section (immediately) adjoining the connection section, the wall thickness may be increased compared to the connection section. In a second subsection (immediately) adjoining the first subsection, the wall thickness may be (preferably continuously) tapered.

According to a further embodiment of the foundation according to the application, an inner diameter of the connecting section (with in particular a constant wall thickness, as described) can essentially correspond to an inner diameter of the tower-shaped foundation structure (in particular in the area of the underside end face). In other words, the respective inner sides/walls of the walls may be substantially in line or aligned accordingly.

In particular, alternatively, an outer diameter of the connecting section (with in particular a constant wall thickness as described) may substantially correspond to an outer diameter of the tower-shaped foundation structure (in particular in the region of the underside end face). In other words, the respective outer sides/walls of the walls may be substantially in line or aligned accordingly.

According to a further embodiment of the foundation according to the application, an inner diameter of the free end portion may be substantially constant from the connecting portion (with in particular a constant wall thickness as described) to the lower end of the free end portion. In other words, the respective outer sides/walls of said sections may be substantially in line or aligned accordingly. An outer diameter of the free end portion (in one embodiment, only the second sub-portion) may taper from the connecting portion to the lower end of the free end portion (preferably steadily, but also in a stepped manner).

Alternatively, an outer diameter of the free end portion may be substantially constant from the connecting portion (with in particular a constant wall thickness as described) to the lower end of the free end portion. In other words, the respective outer sides/walls of said portions may be substantially in line or aligned accordingly. An inner diameter of the free end portion may taper from the connecting portion to the lower end of the free end portion (preferably steadily, but also gradually).

According to a further preferred embodiment of the foundation according to the application, a mineral building material with a compressive strength of more than 120 N/mm² and/or a w/c ratio of at least less than 0.35 may be used as the mineral building material in a binding region of the tower-shaped foundation structure in which one end of the binding element (in particular the described bound end section) is bound in the tower-shaped foundation structure.

In other words, in the area where the bonded end section extends in the foundation wall, an ultra high strength concrete (UHFB; also referred to as Ultra High Performance Concrete) can be used as the mineral building material. This can provide sufficient strength, particularly in the connection area between the foundation wall and the tie-in element. In particular, a mineral building material with a yield strength (yield point) between 120 and 200 MPA, preferably between 140 and 200 MPA (at a 0.2% yield strength) can be used.

Another aspect of the application is an offshore structure, in particular an offshore wind power structure. The offshore structure comprises at least one foundation as previously described. The offshore structure comprises at least one offshore device supported by the foundation.

In a further aspect, a method of manufacturing or fabricating a foundation, in particular a previously described foundation, comprises:
  providing on-shore a formwork, wherein an annular gap in the formwork from a first, upper end of the formwork towards a second, lower end of the formwork in particular remains the same,
  casting the formwork with a liquid concrete, and
  curing the concrete such that the cured concrete forms a tower-shaped foundation structure,
  fixing a binding element formed from a metallic material to the underside end face of the hardened tower-shaped foundation structure.

In other variants, the fastening may comprise inserting a bonded end portion of a binding member formed of a metallic material into the annular gap at the lower end of the shell.

Preferably, according to a preferred embodiment of the method according to the application, the method may further comprise:
  shipping the formed tower-shaped foundation structure to an offshore installation site,
  wherein the tower-shaped foundation structure is rammed or vibrated into the underwater bottom (in particular a seabed) at the installation site.

A still further aspect of the application is a use of a tie-in element formed of a metallic material and having a length of at least 0.5 m on a bottom end face of a tower-shaped foundation structure formed of a mineral building material of a foundation of an offshore structure, in particular a previously described foundation.

The features of the foundations, offshore structures, uses and methods can be freely combined with each other. In particular, features of the description and/or of the dependent claims may be independently inventive, even by completely or partially circumventing features of the independent claims, alone or freely combined with each other.

BRIEF DESCRIPTION OF THE DRAWINGS

There are now a multitude of possibilities for designing and further developing the foundation according to the application, the offshore structure according to the application, the use according to the application and the methods according to the application. For this purpose, reference is made on the one hand to the claims subordinate to the independent claims, and on the other hand to the description of embodiments in connection with the drawing. The drawing shows:

DETAILED DESCRIPTION

In the following, the same reference signs are used for the same elements. Here, Z refers to the vertical axis and x and y to horizontal axes. Furthermore, in the present application the expressions "bottom", "lower" etc. and "top", "upper" etc. refer in particular to the vertical axis z and in particular to the installation state of the foundation.

Figure 1:
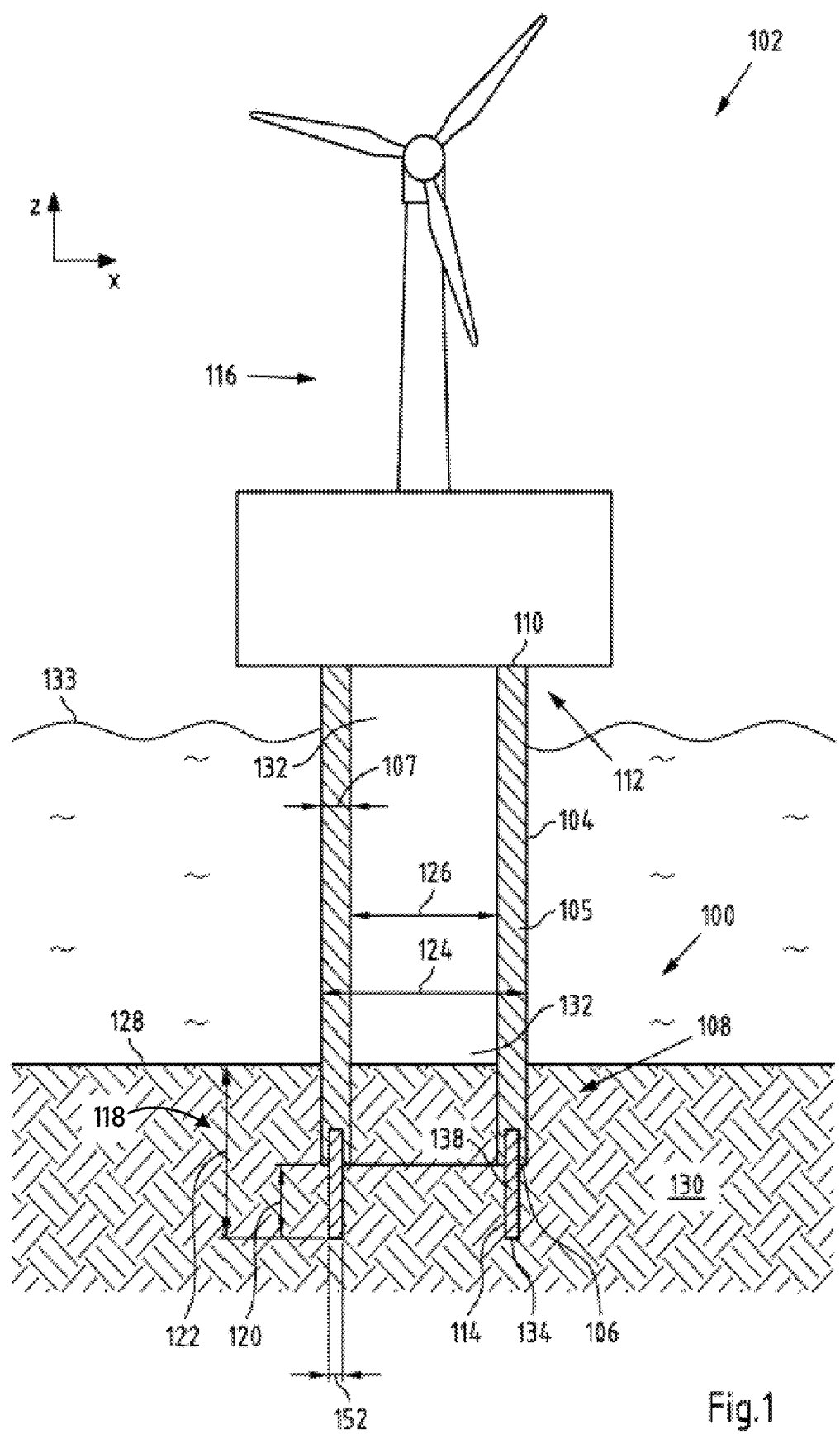
FIG. 1 is a schematic view of an embodiment of an offshore structure according to the present application with an embodiment of a foundation according to the present application.

FIG. 1 shows a schematic view of an embodiment example of an offshore structure 102 according to the present application with an embodiment example of a foundation 100 according to the present application.

As an offshore structure 102, an offshore wind power structure 102 in the form of an offshore wind turbine 102 is exemplarily shown in the present application. The offshore structure 102 and thus the foundation 100 are shown in an installation state. The following embodiments can be transferred in a simple manner to other offshore structures.

The offshore structure 102 comprises at least one foundation 100 and at least one offshore device 116 (e.g. tower, rotor, generator, etc.). The foundation 100 comprises a tower-shaped foundation structure 104. The tower-shaped foundation structure 104 comprises a circumferential foundation wall 105 extending in the longitudinal direction (i.e. along the longitudinal axis).

The foundation wall 105 is bounded at the lower end 108 of the tower-shaped foundation structure 104 by a lower end face 106. At the upper end 112 of the tower-shaped foundation structure 104, the foundation wall 105 is bounded by an upper-side end surface 110.

Preferably, the tower-shaped foundation structure 104 is formed as a hollow structural element, preferably with a circular cross-sectional area. In particular, the tower-shaped foundation structure 104 may be formed as a hollow pile having an interior 132.

As described above, FIG. 1 shows the foundation 100 in an installation state in which a tie-in end 118 of the tower-shaped foundation structure 104 is founded in the subsea soil 130 or subsea subsoil 130 (reference mark 128 denotes the subsea soil surface), i.e. is tied into the subsea soil 130 with a depth 122 or tie-in length 122 (e.g. between 7 m and 20 m). The tower-shaped foundation structure 104 protrudes above the water surface 133. The tower-shaped foundation structure 104 may be connected to a transition piece, for example via a grout connection, which is conventionally known.

The foundation wall 105 is preferably made of concrete (as has been described previously), in particular cast from concrete.

As can be seen from FIG. 1, the wall thickness 107 or wall thickness 107 remains constant or unchanged in the longitudinal direction (z) along the entire length of the tower-shaped foundation structure 104. The inner diameter 126 of the tower-shaped foundation structure 104 remains constant over the entire length of the tower-shaped foundation structure 104. Furthermore, the outer diameter 124 of the tower-shaped foundation structure 104 is constant along the entire length of the tower-shaped foundation structure 104.

In other variations of the application, the wall thickness of the foundation structure may change. For example, the wall thickness may taper from the top end face 110 to the bottom end face, for example by increasing the inner diameter and keeping the outer diameter constant, or by decreasing the outer diameter and keeping the inner diameter constant.

According to the application, at least one binding element 114 made of a metallic material (preferably steel) with a length 120 (measured from the underside end face 106 to the lower end 134) of at least 0.5 m is arranged on the underside end face 106. The lower end 134 means in particular the point of the foundation 100, in particular of the binding element 114, which is bound deepest (in vertical direction z) in the underwater bottom in the installation state of the foundation structure.

The binding element 114 made of metal, in particular steel, supports the installation process and in particular the displacement of soil material during the installation process.

In particular, due to the metal design, the wall thickness 152 of a tie-in wall 138 of the tie-in element 114 may be less (e.g. less than 90%, preferably less than 70%, more preferably less than 50% (and more than 10%) of the wall thickness 107 of the foundation wall 105) than the wall thickness 107 of the foundation wall 105.

FIGS. 2 to 5 show schematic (sectional) views of various embodiments of foundations 200 to 500 according to the present application, in particular with other forms of embedment elements 214 to 514. In order to avoid repetition, essentially only the differences from the preceding embodiment example are described below and otherwise reference is made to the comments on FIG. 1.

A circumferential binding wall 238 of a metallic binding element 214 can preferably be divided into a (single) bound end portion 244 (which may also be referred to as an embedded end portion or incorporated end section), a free end portion 240 and a connecting portion 242 connecting the bound end portion 244 and the free end portion 240. Preferably, the binding wall 238 is integrally formed.

Figure 2:
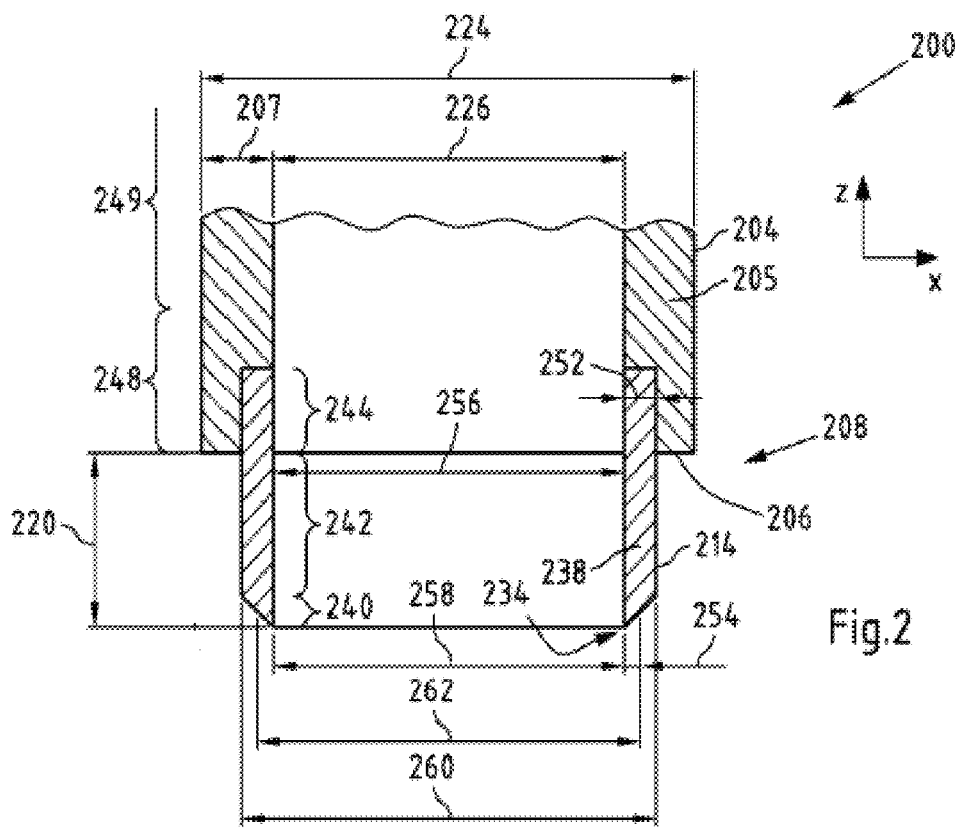
FIG. 2 is a schematic sectional view of a further embodiment of a foundation according to the present application.

As can be seen from FIG. 2, the bound end portion 244 is bound, in particular firmly anchored, in the mineral material, in particular the concrete, in a binding region 248 at the lower end 208 of the foundation wall 205. Preferably, a face hole and a dowel anchorage may be used to anchor the bound end portion into the foundation wall.

Preferably, the mineral building material used in the binding region 248 (which also may be referred to as an embedment region, tie-in area or connection area) of the tower-shaped foundation structure 204, in which the bound end portion 244 is presently embedded in the tower-shaped foundation structure 204, may be a mineral building material having a compressive strength of greater than 150 N/mm$^2$ and a w/c ratio of at least less than 0.25.

In other words, in the binding region 248 where the bound end portion 244 extends in the foundation wall 205, in particular an ultra high performance concrete (UHFB; also referred to as Ultra High Performance Concrete) can be used as a mineral building material, while in the remaining section 249 a mineral building material with a lower strength can be used. This can provide sufficient strength, particularly in the binding region 248 between the foundation wall 208 and the tie-in element 214.

The connecting section 242 adjoining the bound-in end section 244 has, in particular, a wall thickness 252 which is constant in the longitudinal direction (z). The wall thickness 252 is at least less than the wall thickness 207 of the foundation wall 205. The length of the connecting section 242 in the longitudinal direction (z) from the underside end face 206 to the beginning of the free end section 240 may be between 0.2 m and 5.8 m.

In the preferred embodiment shown, an inner diameter 256 of the connection section 242 substantially corresponds to an inner diameter 226 of the tower-shaped foundation structure 204 (in the region of the underside end face 206). In particular, this means that, as shown in FIG. 2, the respective inner sides of the walls 205, 238 are substantially in line. The outer diameter 260 of the connecting section 242 is smaller than the outer diameter 224 of the foundation wall 205.

The free end portion 240 has a wall thickness 254 which is modified with respect to the wall thickness 252, in the present preferred embodiment example a continuously reducing wall thickness 254. As can be seen from FIG. 2, the free end portion 240 has a triangular cross-sectional area in the x-z sectional view. In other words, the free end portion 240 may in particular form a pointed lower end 234 of the binding element 214.

An inner diameter 258 of the free end portion 240 remains substantially the same or constant from the connecting portion 242 to the lower end 234 of the free end portion 240 in the illustrated preferred embodiment. In particular, an outer diameter 262 of the free end portion 240 (between the end of the connecting portion 242 and the lower end 234 of the free end portion 240) tapers steadily.

Tests have shown that this embodiment supports the displacement of soil material particularly well and thus makes the installation process particularly easy. In particular, the risk of grafting is reduced, especially when the diameter of the tower-shaped foundation structure is small.

Figure 3:
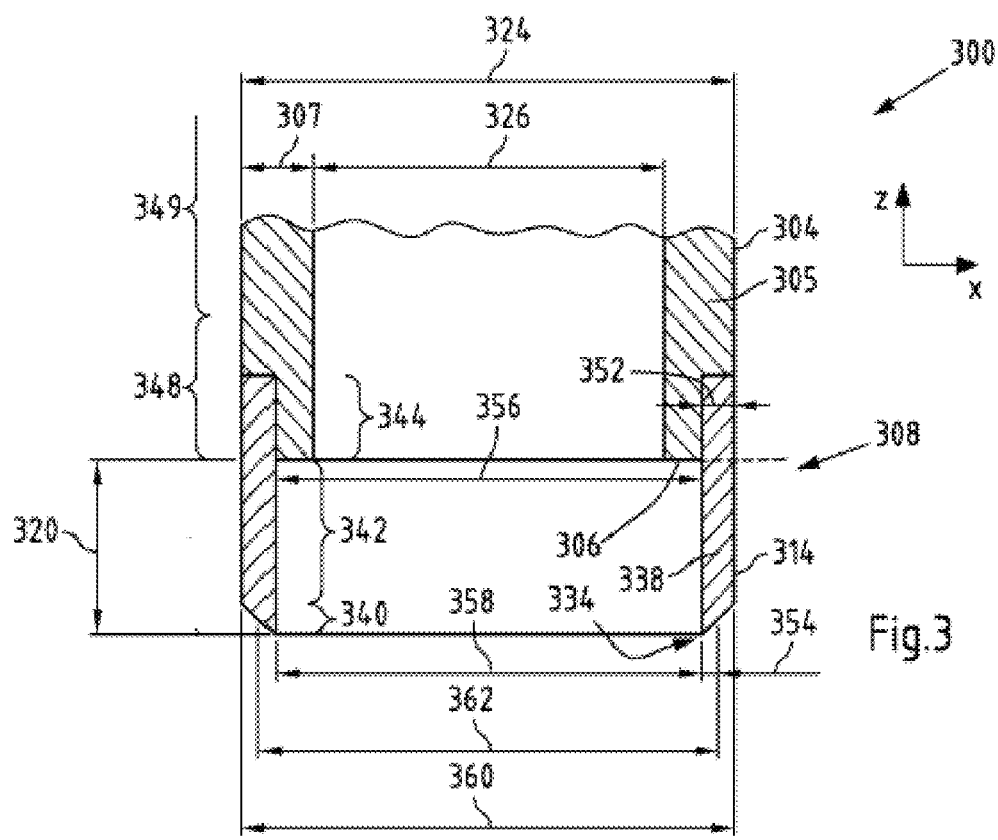
FIG. 3 is a schematic sectional view of a further embodiment of a foundation according to the present application.

The embodiment example according to FIG. 3 differs from the embodiment example according to FIG. 2 in particular in that an outer diameter 360 of the connecting section 342 substantially corresponds to an outer diameter 324 of the tower-shaped foundation structure 304 (in the region of the underside end face 306).

This means in particular that, as shown in FIG. 3, the respective outer sides of the walls 305, 338 are essentially in line. The inner diameter 356 of the connecting section 342 is smaller than the outer diameter 326 of the foundation wall 305.

Figure 4:
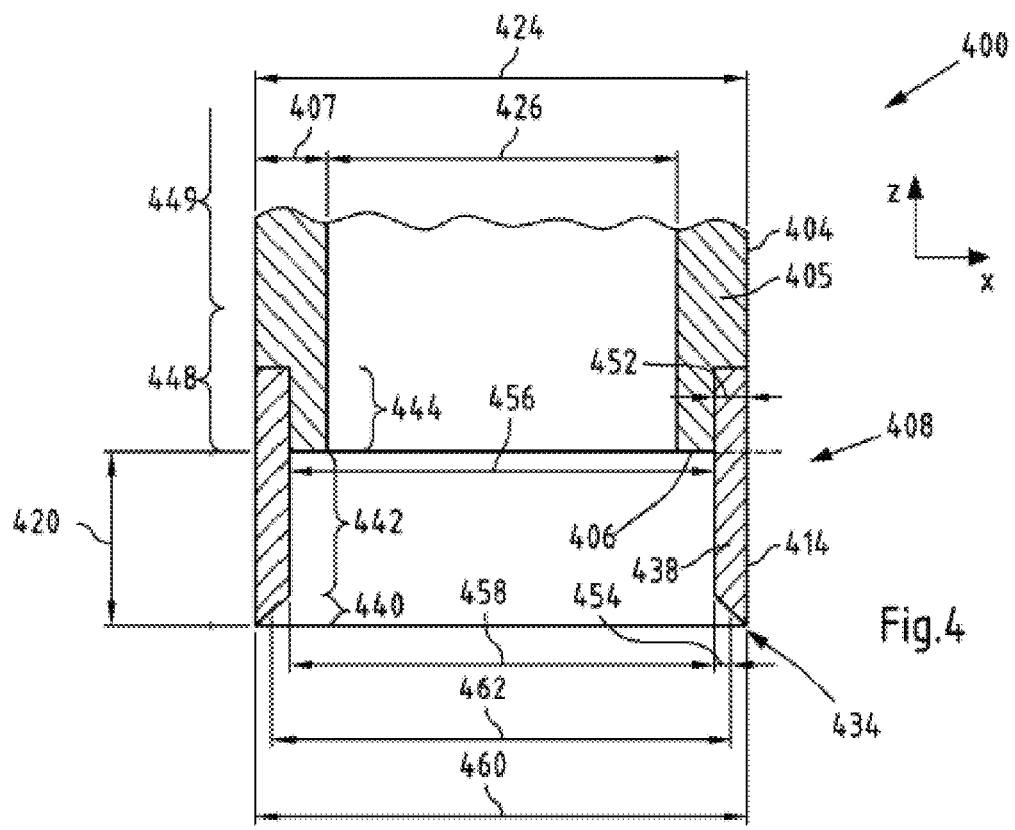
FIG. 4 is a schematic sectional view of a further example of a foundation according to the present application.

The embodiment example according to FIG. 4 differs from the embodiment example according to FIG. 3 in particular in that an outer diameter 462 of the free end portion 440 in the embodiment example shown remains substantially the same or constant from the connecting portion 442 to the lower end 434 of the free end portion 440. In particular, an inner diameter 458 of the free end portion 440 (between the end of the connecting portion 442 and the lower end 434 of the free end portion 440) tapers steadily.

Figure 5:
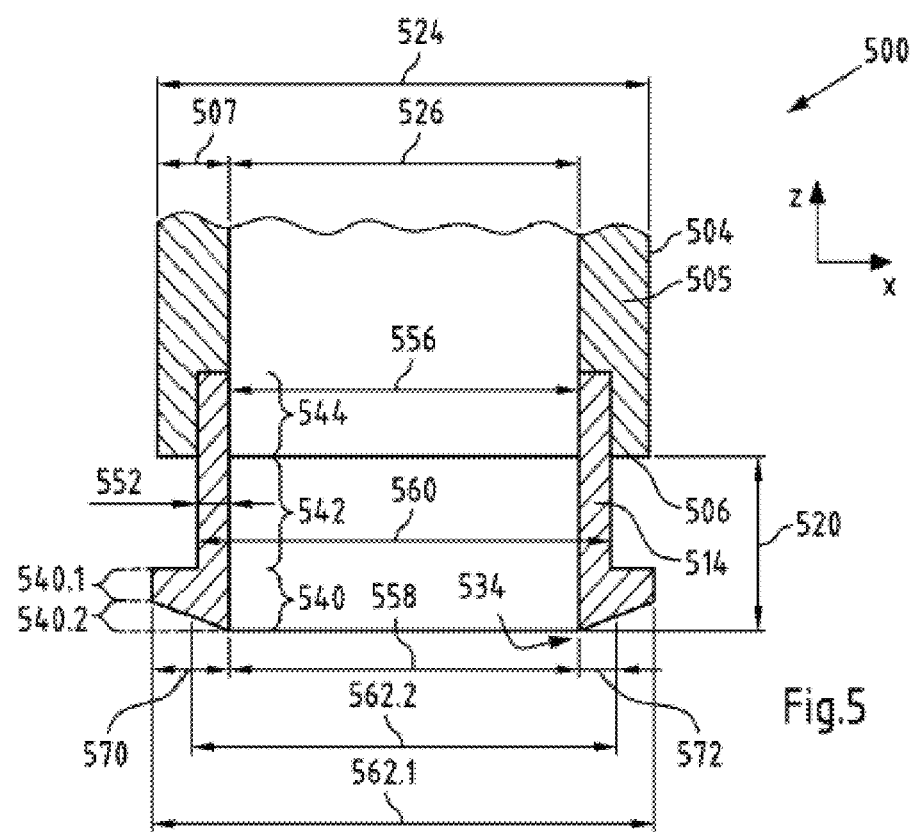
FIG. 5 is a schematic sectional view of a further embodiment of a foundation according to the present application.

FIG. 5 differs from the embodiments according to FIGS. 2 to 4 in particular in that a wall thickness 570 (at least immediately adjacent to the connecting portion 542) of the free end portion 540 is greater than the wall thickness 552 of the connecting portion 542. Preferably, the wall thickness 570 of the free end portion 540 may substantially correspond to the wall thickness 507 of the foundation wall 505.

In particular, the free end portion 540 may be divided into two sub-portions 540.1, 540.2. A first sub-section 540.1 (directly) adjoins the connecting section 542 and in particular has a constant or uniform wall thickness 570, which in particular is greater than the wall thickness 552 of the connecting section 542.

The second subsection 540.2 (directly) adjoins the first subsection 540.2 and in particular has a (continuously) reducing wall thickness 572. The second subsection 540.2 has in particular the lower end 534. In the x-z sectional view, the second subsection 540.2 has in particular a triangular cross-sectional area.

As can also be seen from FIG. 5, the inner diameter 526 of the foundation wall 505 preferably corresponds to the inner diameter of the connecting section 542 and in particular to the inner diameter 558 of the free end section 540.

Furthermore, it can be seen that preferably the outer diameter 560 of the connecting section 542 (with constant wall thickness of the connecting section 542) is smaller than the outer diameter 524 of the foundation wall 505.

The outer diameter 562.1 of the first sub-section 540.1 is at least larger than the outer diameter 560 of the connecting section 542 and may preferably be substantially equal to the outer diameter 524 of the foundation wall 505. The outer diameter 562.2 of the second sub-section 540.2 preferably reduces steadily.

Tests have shown that the special design of the binding element 514 according to the embodiment example in FIG. 5 can significantly reduce the sheath friction in the area of the foundation wall 505 and thereby significantly facilitate the installation process.

Figure 6:
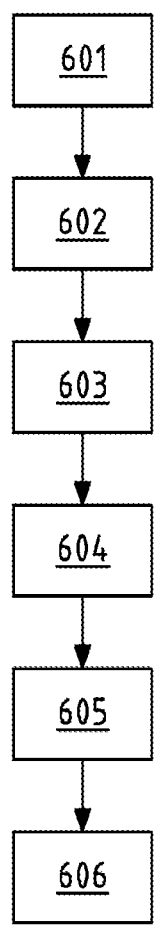
FIG. 6 is a diagram of an embodiment of a method according to the present application.

FIG. 6 shows a diagram of an embodiment example of a method according to the present application for producing a foundation, in particular a foundation according to one of the embodiment examples according to FIGS. 1 to 5.

In a step 601, a formwork is provided on-shore, wherein an annular gap in the formwork from a first end of the formwork to a second end of the formwork remains the same or is constant. The annular gap is radially circumferential and extends in the axial direction or in the longitudinal direction over the entire formwork.

In a step 602, the formwork is poured with a liquid concrete.

Then, in step 603, the liquid concrete is cured in such a way that the cured concrete forms a tower-shaped foundation structure.

For example, the tower-shaped foundation structures are cast from concrete using slipform and jumpform methods and are dried in an upright position.

In step 604, a tie-in element formed of a metallic material is attached to the underside face of the cured tower-shaped foundation structure. In a variant of the application, an insertion of a bound end portion of a binding element formed of a metallic material into the annular gap at the lower end may take place, which may in particular comprise the lower side end face.

Optionally, in step 605, shipping of the formed tower-shaped foundation structure to an offshore installation location may be performed. In particular, after curing, a formed tower-shaped foundation structure may be rotated once by 180° and loaded onto a vessel 26.

In step 606, the tower-shaped foundation structure may optionally be rammed or vibrated into the seabed at the installation location.

In particular, tower-shaped foundation structures may be shipped upright on a vessel to an installation site and founded there using a suitable foundation tool. The tower-shaped foundation structures can already be stored on the ship in such a way that the lower face is at the bottom and the upper face is at the top, so that during foundation the lower face is placed on the underwater bottom and the tower-shaped foundation structure is rammed or vibrated into the underwater bottom by means of the foundation tool.

What is claimed is:

1. A foundation, comprising:
   at least one tower-shaped foundation structure with a circumferential foundation wall extending in a longitudinal direction, the circumferential foundation wall being bounded on an underside by an underside end face and the circumferential foundation wall formed of a mineral building material;
   at least one binding element formed of a metallic material and arranged on the underside end face;
   wherein a length of the at least one binding element from the underside end face to a lower end of the at least one binding element is at least 0.5 m;
   wherein the at least one binding element comprises a longitudinally extending circumferential tie-in wall which extends from the circumferential foundation wall;
   wherein the foundation is an offshore wind power structure foundation; and
   wherein the foundation is configured to be rammed and/or vibrated into a seabed.

2. The foundation according to claim 1, wherein:
   the length of the at least one binding element from the underside end face to the lower end of the at least one binding element is between 1 m and 9 m.

3. The foundation according to claim 1, wherein:
the circumferential foundation wall is bounded at a top by a top end face; and
a wall thickness of the circumferential foundation wall is substantially constant from the top end face to the underside end face.

4. The foundation according to claim 1, wherein:
a wall thickness of the circumferential foundation wall is at least greater than a wall thickness of the circumferential tie-in wall.

5. The foundation according to claim 1, wherein:
a wall thickness of the circumferential foundation wall is between 150 mm and 400 mm; and
a wall thickness of the circumferential tie-in wall is between 10 mm and 100 mm.

6. The foundation according to claim 1, wherein:
the circumferential tie-in wall comprises a free end portion, a bound end portion and a connecting portion connecting the free end portion to the bound end portion; and
the bound end portion is incorporated in the circumferential foundation wall.

7. The foundation according to claim 6, wherein:
a wall thickness of the connecting portion is constant from the free end portion to the bound end portion.

8. The foundation according to claim 6, wherein:
a wall thickness of the free end portion is different from a wall thickness of the connecting portion.

9. The foundation according to claim 8, wherein:
the wall thickness of the free end portion tapers from the connecting portion to a lower end of the free end portion.

10. The foundation according to claim 8, wherein:
the wall thickness of the free end portion is greater than the wall thickness of the connecting portion.

11. The foundation according to claim 6, wherein:
an inner diameter of the connecting portion substantially corresponds to an inner diameter of the at least one tower-shaped foundation structure.

12. The foundation according to claim 6, wherein:
an outer diameter of the connecting portion substantially corresponds to an outer diameter of the at least one tower-shaped foundation structure.

13. The foundation according to claim 6, wherein:
an inner diameter of the free end portion is substantially constant from the connecting portion to a lower end of the free end portion; and
an outer diameter of the free end portion tapers from the connecting portion to the lower end of the free end portion.

14. The foundation according to claim 6, wherein:
an outer diameter of the free end portion is substantially constant from the connecting portion to a lower end of the free end portion; and
an inner diameter of the free end portion tapers from the connecting portion to the lower end of the free end portion.

15. The foundation according to claim 1, wherein:
the mineral building material has a compressive strength of more than 150 N/mm$^2$.

16. The foundation according to claim 1, wherein:
the mineral building material has a water-cement ratio less than 0.25 in a bonding region of the at least one tower-shaped foundation structure in which one end of the binding element is bonded in the at least one tower-shaped foundation structure.

17. A method to produce a foundation, comprising:
providing on-shore a formwork, wherein the formwork has an annular gap from a first, upper end towards a second, lower end which remains constant;
casting the formwork with a liquid mineral building material;
curing the concrete such that the cured concrete mineral building material forms a tower-shaped foundation structure; and
securing at least one binding element to the cured tower-shaped foundation structure;
wherein the tower-shaped foundation structure has a circumferential foundation wall extending in a longitudinal direction, the circumferential foundation wall being bounded on an underside by an underside end face and the circumferential foundation wall formed of the mineral building material;
wherein the at least one binding element is formed of a metallic material and arranged on the underside end face;
wherein a length of the at least one binding element from the underside end face to a lower end of the at least one binding element is at least 0.5 m;
wherein the at least one binding element comprises a longitudinally extending circumferential tie-in wall which extends from the circumferential foundation wall;
wherein the foundation is an offshore wind power structure foundation; and
wherein the foundation is configured to be rammed and/or vibrated into a seabed.

18. A binding element of a foundation, comprising:
the binding element formed of a metallic material and having a length of at least 0.5 m;
the binding element on an underside end face of a circumferential foundation wall of a tower-shaped foundation structure formed of a mineral building material of the foundation;
wherein the binding element comprises a longitudinally extending circumferential tie-in wall which extends from the circumferential foundation wall;
wherein the foundation is an offshore wind power structure foundation; and
wherein the foundation is configured to be rammed and/or vibrated into a seabed.

* * * * *